United States Patent [19]

Allibhoy et al.

[11] Patent Number: 5,805,155
[45] Date of Patent: Sep. 8, 1998

[54] VIRTUAL ASSETS IN AN INTERACTIVE TELEVISION CABLE SYSTEM

[75] Inventors: Nizar Allibhoy, Northridge; Joseph George Buehl, Van Nuys; Joe Edmonds, Los Angeles, all of Calif.

[73] Assignee: Time Warner Entertainment Co. L.P. Time Warner Cable, Stamford, Conn.

[21] Appl. No.: 834,241

[22] Filed: Apr. 15, 1997

[51] Int. Cl.⁶ .................................................. H04N 7/14
[52] U.S. Cl. ........................... 345/327; 348/13; 348/12; 395/200.49; 455/4.2; 455/5.1
[58] Field of Search .................................. 345/326, 327; 348/6, 7, 10, 11, 12, 13; 455/3.1, 4.1, 4.2, 5.1, 6.1, 6.2; 395/200.47–200.49; H04N 7/10, 7/14, 7/173

[56] References Cited

U.S. PATENT DOCUMENTS

| | | |
|---|---|---|
| 5,093,718 | 3/1992 | Hoarty et al. . |
| 5,247,575 | 9/1993 | Srague et al. .......................... 348/13 X |
| 5,361,091 | 11/1994 | Hoarty et al. . |
| 5,412,720 | 5/1995 | Hoarty . |
| 5,696,905 | 12/1997 | Reimer et al. ......................... 348/12 X |

*Primary Examiner*—Mark R. Powell
*Assistant Examiner*—John W. Miller
*Attorney, Agent, or Firm*—Homer L. Knearl; Holland & Hart llp

[57] ABSTRACT

An interactive cable TV system includes a large number of set-top terminals that are connected to a system headend by way of a low-speed, time division multiplexed, channel. The headend includes the mass storage of multimedia data-assets that each contain a large number of individual data-items that may be of interest to various set-top users. A set-top user initiates an inquiry to the data-asset storage by way of an item-descriptor comprising a word-picture of the item. When this set-top query is received at the headend, a table or list is established whereby the query and its set-top ID are associated with related data assets. As the headend's data-asset storage is changed from time to time, the changes that relate to listed set-top queries result in an update of the query list. This updated data-asset information is sent to the related set-tops immediately, or is sent only when the headend receives a request from the related set-top.

31 Claims, 8 Drawing Sheets

VIRTUAL ASSETS IN AN INTERACTIVE TELEVISION CABLE SYSTEM

BACKGROUND OF THE INVENTION

1. Field of the Invention:

This invention relates to interactive multimedia communication networks, such as interactive TV cable systems or ITV systems, that send both broadcast and on-demand features to a number of subscribers, wherein each subscriber location includes a set-top terminal and a television (TV) set that is connected to the set-top terminal.

2. Description of the Related Art:

On demand, interactive, television (ITV) systems are known in the art. U.S. Pat. No. 5,093,718 to Hoarty et al, U.S. Pat. No. 5,412,720 to Hoarty and U.S. Pat. No. 5,361,091 to Hoarty et al, incorporated herein by reference, are examples.

ITV systems inherently require a number of multimedia data-sources or data-assets that are physically located at the cable system's headend, and that can be interrogated by system subscribers, as the subscribers selectively use their set-tops send on-demand queries to the headend. In current ITV systems the various data assets are queried or referenced by using a different and specific filename for each different data-asset. For example, a set-top query may be for headend file "xyz.gif", after which a second set-top query would be made for a "blue polo shirt" that may be contained the file "xyz.gif" that was acquired from the headend This prior use of filenames does not accommodate presentation to the set-top user of real-time and dynamic data, such as, for example, stock market quotes and sports scores.

The present invention fills the need in the art for an apparatus/method that associates a set-top query for dynamic data that has specific and never-changing attributes with all of the ITV system's data-assets that satisfy the set-top query. The apparatus/method of this invention does not require the set-top user to specify the filename of each of the various query-associated data-assets, and as headend data-assets change, the headend operates to compare prior set-top queries to the new data-assets. In this way, query-related new-asset information is automatically sent from the headend to the one or more set-tops whose prior queries match the new-asset information.

SUMMARY OF THE INVENTION

The present invention provides an apparatus/method that associates a set-top query with all of the ITV system's data-assets that satisfy the set-top query; i.e., all data-assets that satisfy a particular client query. In accordance with the present invention, the set-top query need specify only the unchangeable attributes or descriptors of a given data-item, and need not specify the filename of each of the various query-associated data-assets in which this data-item is located. In this way, all of the query-associated data-assets, that is all data-assets that contain one or more data-items that satisfy the query, become virtual assets.

The present invention not only accommodates an automatic response to an initial set-top query, but in addition, the present invention continues to update all data asset(s) that contains the attribute-specified data. The updated data-assets can be automatically sent to the related set-tops, or sending of the updated data-assets can await a repeat of the set-top's query.

Two apparatus/method embodiments are provided to implemented the virtual asset concept of the present invention. The first is called server-push, the second is called client-pull. Server-push is initiated immediately by the headend when a related data-asset data-item is changed. Client-pull, also called user-pull, is initiated at a later time when the related set-top repeats the set-top query.

As an example, a set-top query could be for "the most active stock on the NYSE". As seen, this set-top query is self-describing; i.e., it is a word-picture of the data-asset data-item that is of interest. In response to this set-top query, a server-application or program that is located at the ITV system's headend automatically uploads the corresponding query-associated data-asset file to the set-top. As the most-active-NYSE stock changes at a later time, a new server-push is automatically initiated by the headend, and this operates to upload one or more query-related and new data-assets to the set-top, without requiring the set-top to initiate a new query for the "the most active stock on the NYSE". This automatic uploading response to a change in the specified data-asset is called a server-push, or a headend-push. In other words, as the headend data-asset that is necessary to satisfy the set-top query changes, the set-top's stored data-asset is automatically updated. An advantage of this server-push mode of operation is that a high-speed headend/set-top channel operates to supply the update, without also requiring use of the low-speed set-top/headend channel by which the set-top initiated the process.

In the server-push embodiment of the present invention, the headend's server maintains a list of all set-top client requests and the asset parameters, or asset attributes, that each set-top client has specified in the request. As the value or an attribute of any listed asset parameter changes at the headend's data-asset facility, the headend server automatically initiates a connection to the set-tops of the associated clients, and then automatically uploads this new data-asset to each of these set-tops. These associated set-tops then operate to replace the previously-stored memory-image of this data-asset with the new and updated data-asset. Subsequently, this new and updated data-asset is the data that is displayed on the set-top's TV when such a display is requested by the client, subscriber or user.

As will be appreciated, this server-push embodiment of the present invention frees the set-top from having to waste the low-speed ITV channel resources by continually asking the headend whether the queried data-asset has changed in the time interval that has expired since the last query was made. In addition, this server-push embodiment of the present invention ensures that the set-top will receive new versions of the query-satisfying data-assets in real time; i.e., as fast as these data-assets change.

The client-pull embodiment of the present invention is generally useful for the acquisition of data that is not particularly time-sensitive, or for which the acquisition of data and a TV redisplay of the data may interrupt the flow of the client's ITV interactivity, and perhaps confuse the client.

In the client-pull embodiment of the present invention, the set-top requests an asset-item by again providing a highly-descriptive item-data query (also called mega-data) that is associated with and descriptive of the item, or product that is of interest. For example, a mega-data item "T-shirt, blue, Bugs Bunny" uniquely identifies a piece of clothing that would be found in a shopping data base or catalogue data base that is located at the headend's data-asset storage. The set-top sends this mega-data to the headend, along with an ID of the requesting set-top, whereupon the headend associates the received mega-data request with a data-asset filename, for example, by using a database or a hash table. The headend then sends this data-asset to the requesting set-top.

Later, if the picture "Bugs Bunny" that is carried by the T-shirt later changes to a different picture, for example due to a marketing decision, the set-top need not initiate a new request for a different filename. Rather, the next time the set-top makes the same mega-data request "T-shirt, blue, Bugs Bunny", the headend's media server operates to associate the received mega-data request with a new data-asset, and then sends this new data-asset to the set-top. Note that in this version of the present invention, update of the set-top's stored data-asset relating to the set-top query takes place only when another query is initiated by the set-top.

When the headend data-asset that satisfies the second mega-data request is a new/changed data-asset, the headend automatically associates the second mega-data request with the new/changed data-asset, and the second new/changed data-asset response is sent to the set-top, transparent of the fact that a new/changed data-asset was sent by the headend.

An object of the present invention is to provide an interactive cable TV system that includes a large number of set-top terminals that are connected to a system headend by way of a low-speed, time division multiplexed channel, wherein the headend includes the mass storage of multimedia data-assets that each contain a large number of individual data-items that may be of interest to various set-top users, wherein a set-top user initiates an inquiry to this data-asset storage by way of an item-descriptor, word-picture, or mega-data that describes attributes, features, or characteristics of the item of interest, wherein when this set-top query is received at the headend, a table or list is established whereby the query and its set-top ID are associated with the related data-assets and its data-items, wherein as the headend's data-asset storage is thereafter changed from time to time, the changes that relate to listed set-top queries result in an update of the query list, and wherein this updated data-asset information is sent to the related set-tops immediately, or is sent upon the headend receiving a request from the related set-top.

This and other objects, features and advantages of the invention will be apparent to those of skill in the related art upon reference to the following detailed description, which description makes reference to the drawing.

DESCRIPTION OF THE PREFERRED EMBODIMENTS

Figure 1:
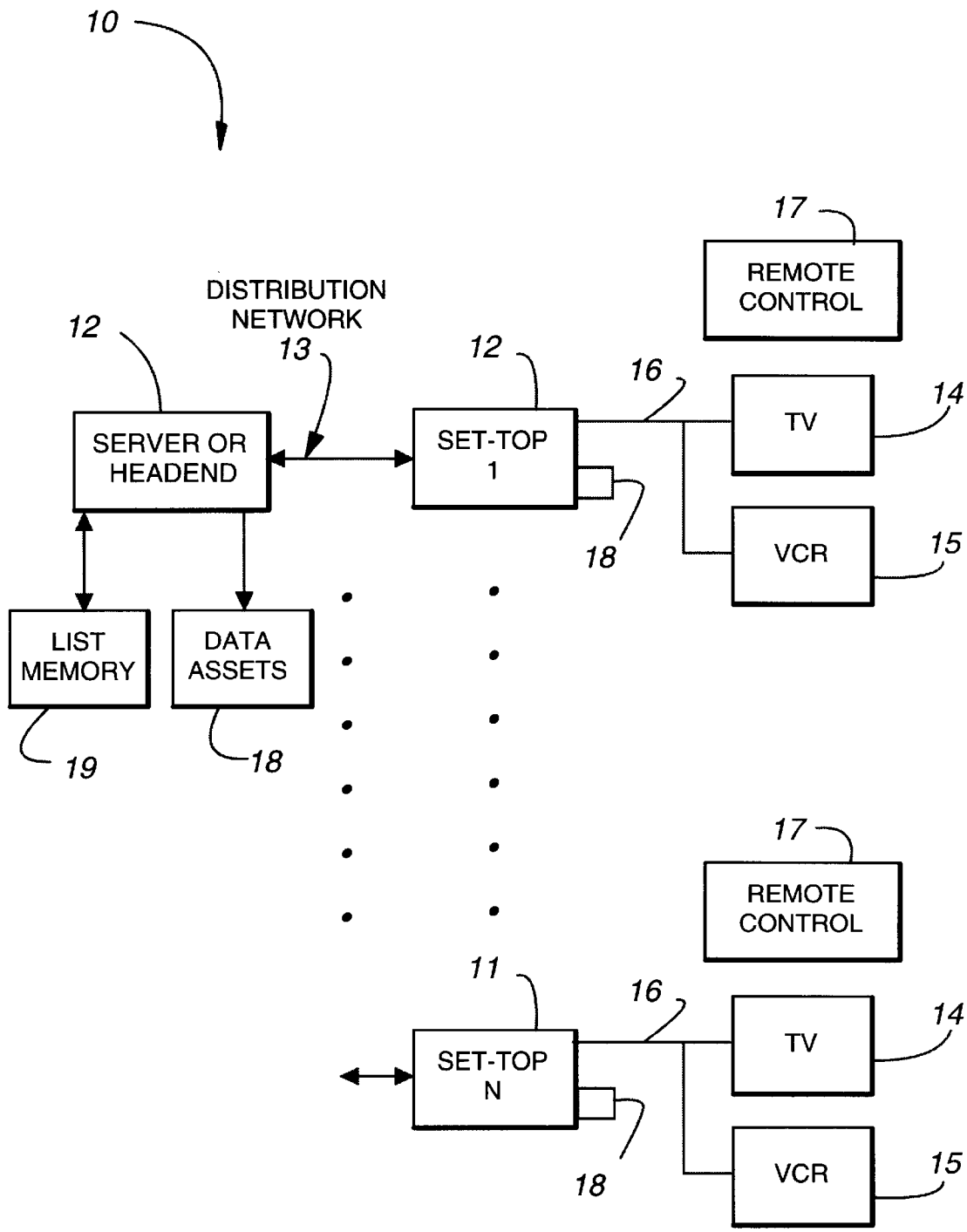
FIG. 1 shows an interactive TV network that incorporates the invention.

FIG. 1 shows an interactive TV network 10 having a headend or server 11 and the number N of individual set-tops 12. This ITV network showing is of a very general and simplified form wherein headend 11 provides both broadcast and interactive viewing services to the N subscribers, or users, that are within network 10.

While it is possible that any individual user could have more than one set-top 12 installed at the user's physical location or home, FIG. 1 assumes that each user has only one set-top connected to the system's headend 11 by way of a two-way analog/digital distribution network 13

Each set-top 12 has one TV set 14 and one VCR 15 connected to that user's set-top. As is well known, each set-top 12 operates to connect one headend channel to TV 14 and/or VCR 15. For example, any given set-top 12 may operate to connect the headend's channel 5 to both its TV 14 and its VCR 15 by way of a cable 16. As is conventional, a set-top 12 transmits all system channels by way of a channel-3 or channel-4 output on cable 16, and all TVs 14 and VCRs 15 are constructed and arranged to receive on channel-3 or on channel-4.

In addition, each of the N user is provided with a manually operable infra-red (IR) remote control(s) 17 that enables a user to communicate with that user's user-top 12 and with that user's VCR 15.

As stated above, channel picture signals, as well as other visual data and audio-data, that is to be presented to a user using a TV set 14, and/or that is to be recorded by operation of a VCR 15, is contained on the output connection or cable 16 that is connected to the output of each set-top 12. In addition, each set-top 12 is provided with an IR control unit 18, or VCR blaster 18, by which a set-top may automatically control the various functions of its associated VCR 15.

Headend 11 includes a number of asset-servers and a number of application-servers. These servers connect to a switching device, such as an Asynchronous-Transfer-Mode (ATM) switch. An output interactive-cable-gateway then operates to convert or reconstruct the headend's outgoing signals/data from the format of the ATM switch network to the format of distribution network 13; for example, to MPEG-2.

List memory 19 and data-assets memory 18 are also provided at headend 11. The two memory components 18,19 are read/write memory devices, generally of the mass storage type, for example DASD. In general terms, data-asset memory 18 comprises a large library of multimedia data-assets that includes, for example, the catalogues of a number of different clothing vendors.

The present invention relates to apparatus/logic/methods that are structurally and functionally resident within set-tops 12 and within headend 11 of network 10.

Figure 2:
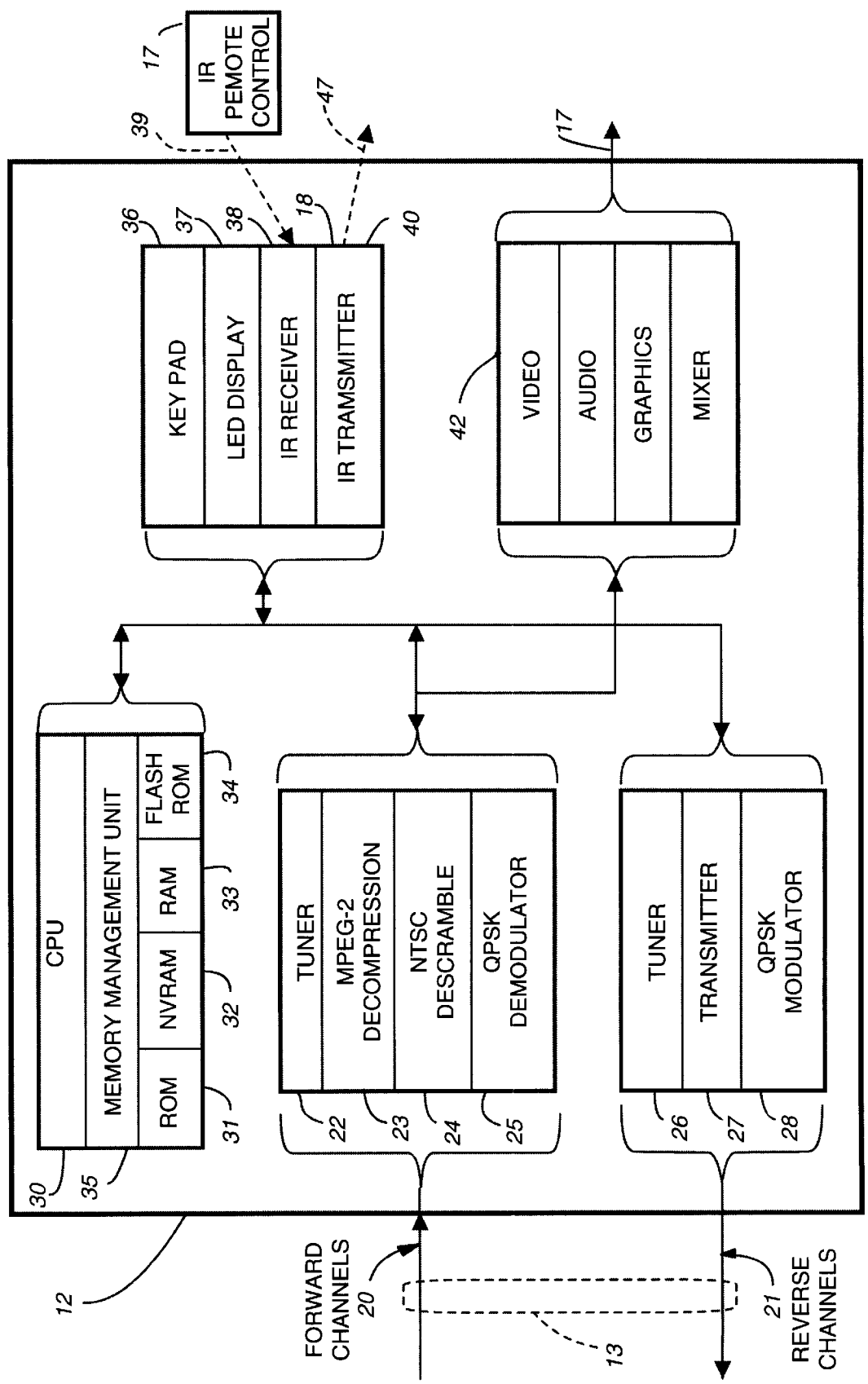
FIG. 2 is a more detailed showing of one of the set-top terminals of FIG. 1.

The FIG. 1 set-tops 12 are of generally the same construction and arrangement, and FIG. 2 shows one of the set-tops in greater detail. The input/output of a set-top comprises FIG-1's distribution network 13. Distribution network 13 is made up of a number of forward channels 20 and number of reverse channels 21. Forward channels 20 comprise the means whereby headend 11 communicates with each of the set-tops 12, whereas reverse channels 21 comprise the means whereby a set-top communicates with headend 11.

Forward channels 20 provide input to a tuner 22, a MPEG-2 decompression unit 23 (Motion Picture Experts Group ISO standard for the compression of video and audio), an NTSC (National Television Standards Committee) descrambler 24, and a QPSK (Quadrate Phase Shift Key) demodulator 25.

Reverse channels 21 is driven by or receives input from a tuner 26, a transmitter 27, and a QSPK modulator 28.

Operation of set-top 12 is controlled by the operation of a Central Processor Unit (CPU) 30. In a manner well known to those of skill in the art, memory elements 31–34 contain data, applications or application-programs, and control programs that enable CPU 30 to perform any of a number of desired control scenarios for the set-top. A memory management unit 35 is also provided.

Each set-top 12 also includes a user-operable keypad or keyboard 36, an LED display 37, an IR receiver 38 that operates to receive IR transmissions 39 from the user's FIG.-1 IR remote control 17, and an IR transmitter 40 that comprises FIG. 1's VCR blaster 18 whereby a VCR 15 is controlled by an IR beam output 41.

The set-top's cable output 16 that is connected to a TV set 14 and to a VCR 15 receives its inputs from a video/audio/graphics storage arrangement 42. Structural arrangement 42 also includes a mixer whereby user-alert-messages that are generated under the control of CPU 30 may be momentarily placed over a portion of a scene that the user is currently viewing on the screen of TV set 14.

While not critical to the invention, forward channels 20 may include both forward application channels and forward data channels. One use of forward application channels 20 is supplying data, messages and control instructions to a set-top during Vertical Blanking Intervals (VBI) of a picture signal that is being transmitted to a set-top. One example of a control instruction is an authorizations signal that enables a given user to view pay-for-view features.

Forward channels 20 provide a high data rate, for example from 27 to 36 megabits per second, whereas reverse channels 21 are relatively low data rate channels, for example 1.5 megabits per second.

Figure 3:
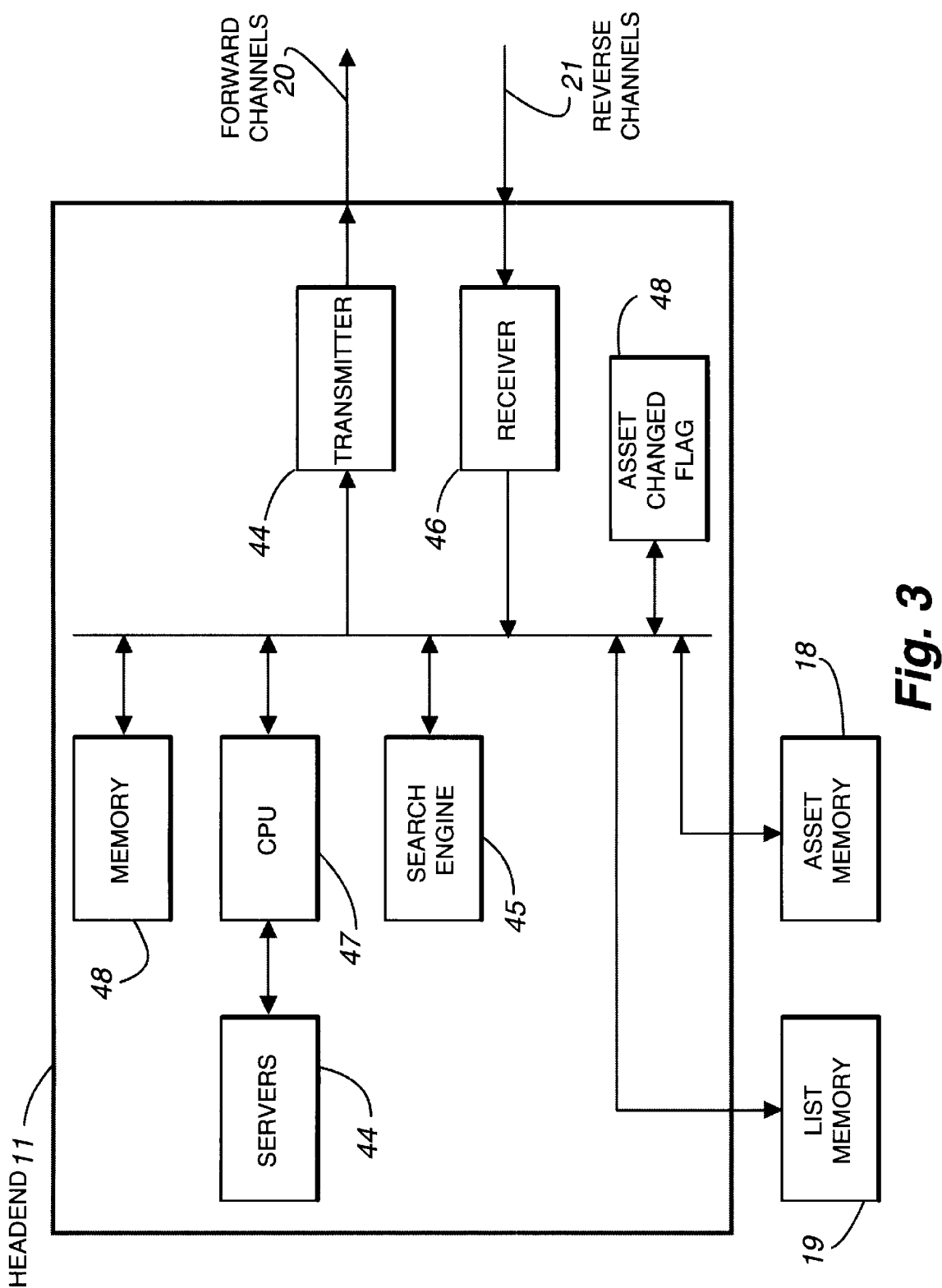
FIG. 3 is a more detailed showing of the headend of FIG. 1.

FIG. 3 shows FIG. 1's headend 11 in somewhat greater detail, it being recognized that headend 11 may be very complex and of many alternate designs. However, the FIG. 3 showing of headend 11 is sufficient to provide an enabling teaching to those skilled in the art. Headend 11 includes a transmitter 44 that is compatible with the receiver apparatus 22–25 of each set-top 12, and that is connected to forward channels 20. A receiver 46 is also provided, this receiver being compatible with the transmitter apparatus 26–28 of each set-top 12. Receiver 46 receives its input from reverse channels 21.

One or more CPUs 47 provide for the functional operation of headend 11. Programming to produce this result is contained in a memory 48 that usually comprises a number of individual memory banks and memory types. One of the processes that is implemented by CPU 47 is searching asset-memory 45 and list memory 19. This is shown at 45 as a search engine. Another function of CPU 47 is to monitor or detect a change of data-assets 18. This is shown at 48 as an asset changed flag that may be set each time a data-asset is changed, and is reset when list memory 19 is updated accordingly.

Figure 4:
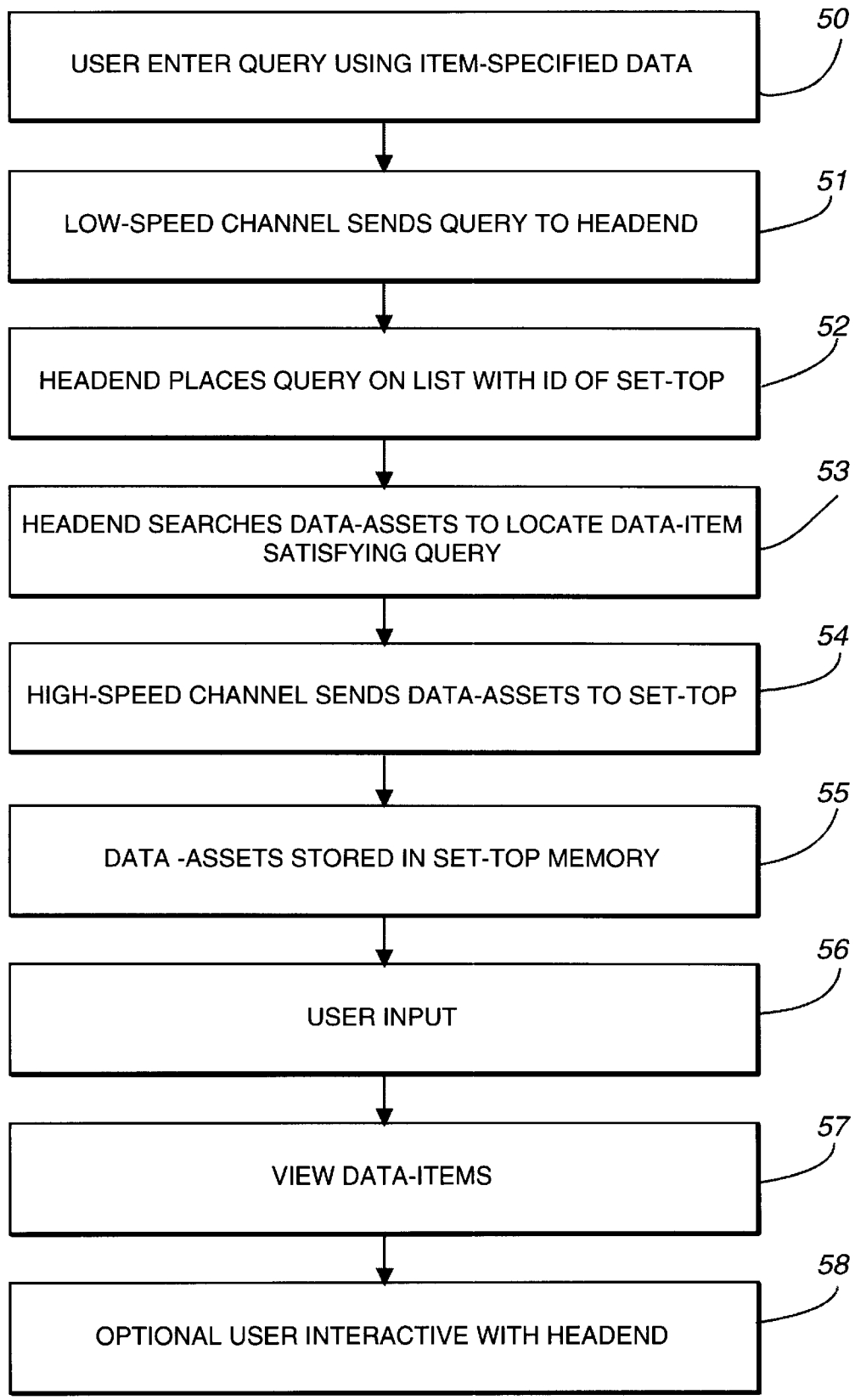
FIGS. 4 and 5 show the server-push apparatus/logic/programming of the present invention in flowchart form.
Figure 5:
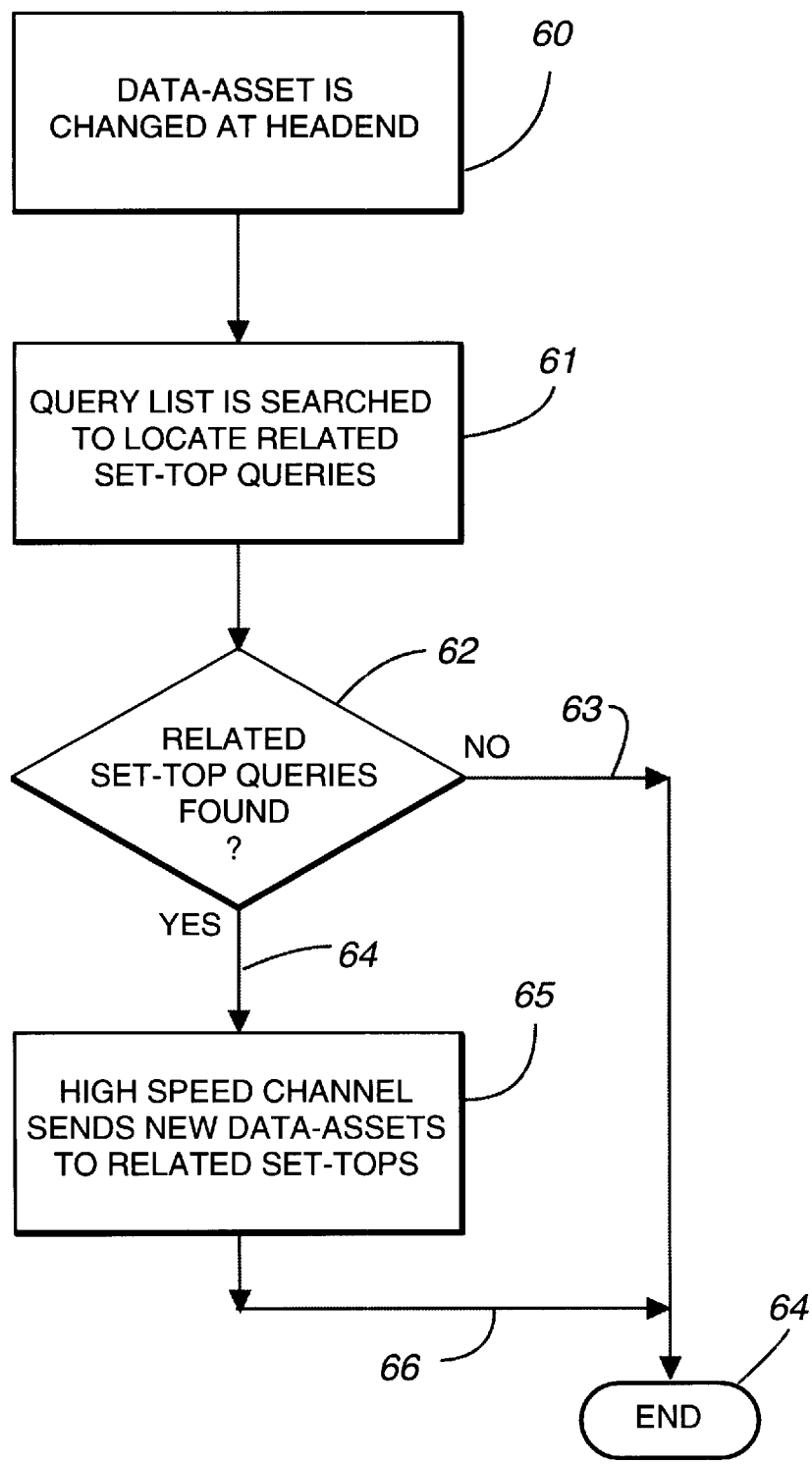

FIGS. 4 and 5 show the server-push apparatus/logic/programming mode of operation of the present invention in flowchart form. At function/apparatus/logic 50 of FIG. 4 a set-top user uses key pad 36 to enter a query. This query contains item-specific data. For example, the self-describing and item-specific query that is manually entered by the set-top user may comprise "short sleeve shirt, blue, large size". This set-top query can also be called a search vector.

At function/apparatus/logic 51 low-speed reverse channels 21 is used to send this set-top query or request to headend 11. This transmission also includes the address, identification, or ID of the originating set-top 12. For example, this request may be sent using data compression and QPSK modulation techniques.

At function/apparatus/logic 52 headend 11 operates to place this query "short sleeve shirt, blue, large size" in list memory 19, along with the unique identification or ID of the set-top that made the request.

In addition, at function/apparatus/logic 53 headend 11 operates to interrogate or search its data assets 18 in order to find all individual data-items that satisfy the set-top request, i.e., to find all data-items that comprise picture-data, and/or text-data, and/or sound-data that relates to a short sleeve shirt that is blue and that is available in a large size.

Once these query-related data-assets and data items are found, function/apparatus/logic 54 operates to use high-speed forward channels 20 to send the data-assets that contain these data-items to the set-top 11 that initiated request 50.

Of course, in the event that no such query-related data-items are found within data-assets 18 by function/apparatus/logic 53, then an appropriate user-message is sent to the related set-top, thereby visually informing the set-top user that the query cannot be satisfied. In this event, the set-top user will likely rephrase the request until a related data-item (s) is found in data-assets 18.

When the high-speed transmitted data-assets(s) is received by the querying set-top 12, the data-asset(s) is stored in set-top memory 31–34 for later viewing, or the query-related data-items are immediately presented on the set-top's TV set, as is indicated at function/apparatus/logic 55.

The next event to occur is indicated at 56; i.e., a control input to the set-top that is provided by the user. This input may comprise interrogation of the stored data-asset using the query "short sleeve shirt, blue, large size". As a result of this user-input, function/apparatus/logic 57 operates to supply the related picture-data, and/or text-data, and/or sound-data to the user's TV set 14.

Once this query-specific-data-item is presented to the user in visually and/or audio manner, conventional means may be provided to afford the user with interactive options, as is indicated at 58 in FIG. 3.

As is apparent from the above description, the set-top user is immediately provided with an appropriate response(s) to a query that required only a word-description of the item-attributes relating to an item of interest. This query did not require that the user have a knowledge of specific data-assets that may contain such an item of interest. In addition, only one use of low-speed reverse channels 21 was required.

At function/apparatus/logic 60 of FIG. 5, an operator-initiated event is indicated. More specifically, an operator at headend 11 (1) loads the headend's data-asset memory 18 with a new-data-asset having a number of individual new data-items, and/or (2) an old-data-asset is completely erased, and/or (3) an old-data-asset is changed or updated by adding new data items, by changing old data items or by erasing old data items. Any of these changes to the headend's data assets 18 presents the possibility that the data-asset changes may thereafter affect the headend's response to a prior set-top-query that is stored in list memory 19 at the time that the set-top query was initially received (see function/apparatus/logic 52 of FIG. 4).

Here it will be assumed that an addition to data-assets 18 has been made that has added a data-item that responds to the set-top query "short sleeve shirt, blue, large size", and that this new data-item is contained in a new data-asset called "Sear's catalog".

At function/apparatus/logic 61, headend 11 detects that the new data-asset 18 "Sear's catalog" has been added at function/apparatus/logic 60, and as a result of this new asset list, memory 19 is interrogated or searched to find all set-top queries (see function/apparatus/logic 50 of FIG. 3) that have been affected by the change at 50. Note that if a data-asset has been changed, but the changed data-items do not relate to one or more set-top queries that are found on query-list 19, no action is necessary by headend 11. Only the set-top queries whose related data-items have been changed at 60 need be noted at 61.

At decision function/apparatus/logic 62 headend 11 determines if any set-top queries whose related data-items have been changed at 60 were noted at 61. A "no" output 63 from decision function/apparatus/logic 62 enables function/apparatus/logic 64 to end the FIG. 5 operation.

However, a "yes" output 64 from decision function/apparatus/logic 62 enables function/apparatus/logic 65 to use FIG. 2's high-speed forward channels 20 to send the new and different data-asset "Sear's catalog" to the related set-tops 12, as these related set-tops are identified by the set-top IDs that are found in list memory 19. After r operation 65 has been completed, output 66 enables function/apparatus/logic 64 to end the FIG. 5 operation.

Note that in the total operation of FIGS. 4 and 5, the query-related data-assets that are stored at a set-top(s) 12 are continually updated using only high-speed forward channels 20. That is, one use of low-speed reverse channels 21 is initially required in order to place the FIG. 4,5 process in place, and thereafter, each update that is required by changes at function/apparatus/logic 50 is supported by one use of high-speed forward channels 20.

In the management of the present invention, it is contemplated that a set-top user will be required to use low-speed reverse channels 21 one time in order to delete queries from list memory 19 when these queries are no longer of interest, or perhaps a set-top user would be required to periodically use low-speed reverse channels 21 to indicate that the set-top query should not be automatically erased from list memory 19 after a relatively long time period of residence within the list memory.

Figure 6:
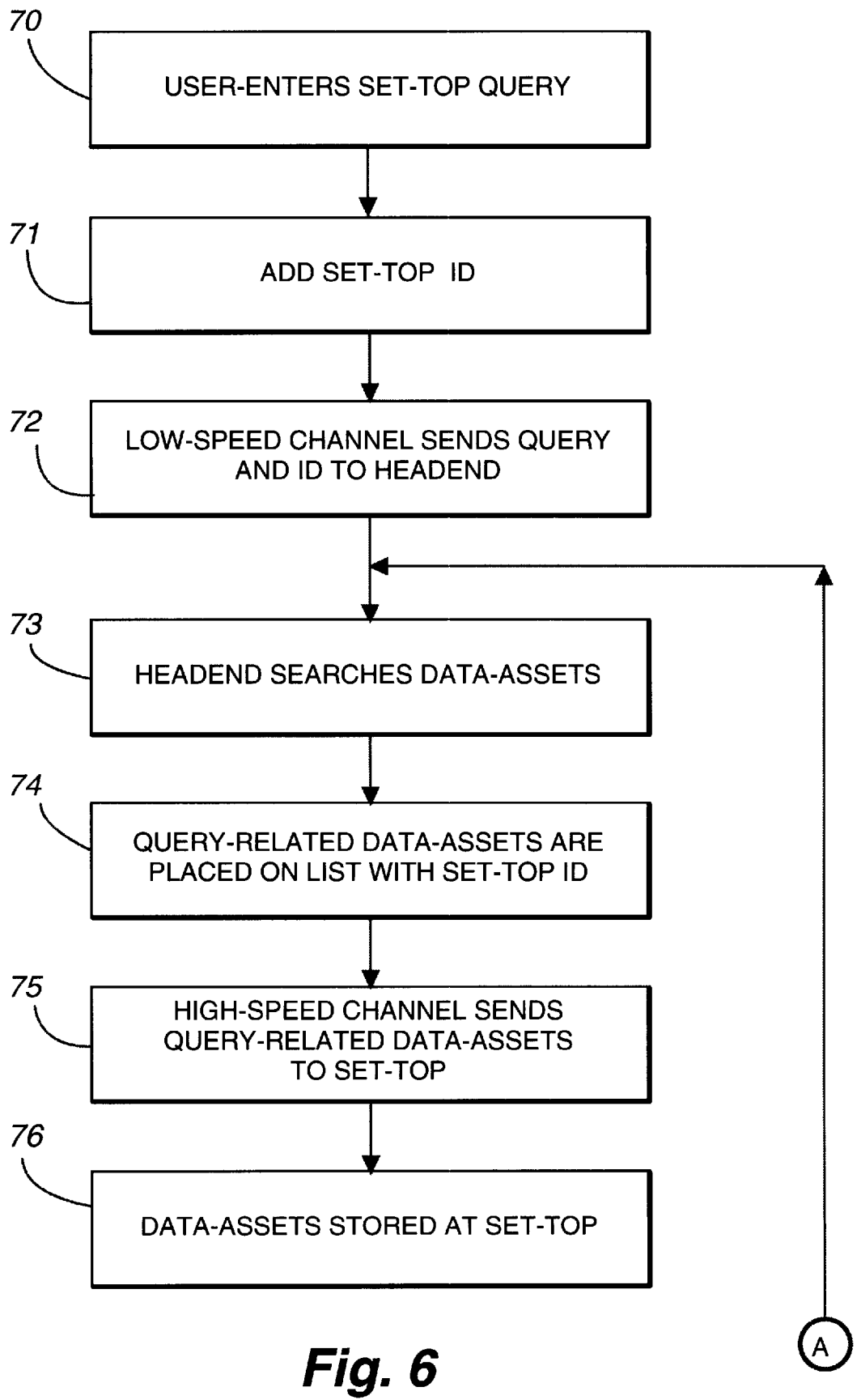
FIGS. 6, 7 and 8 show the client-pull apparatus/logic/programming of the present invention.
Figure 7:
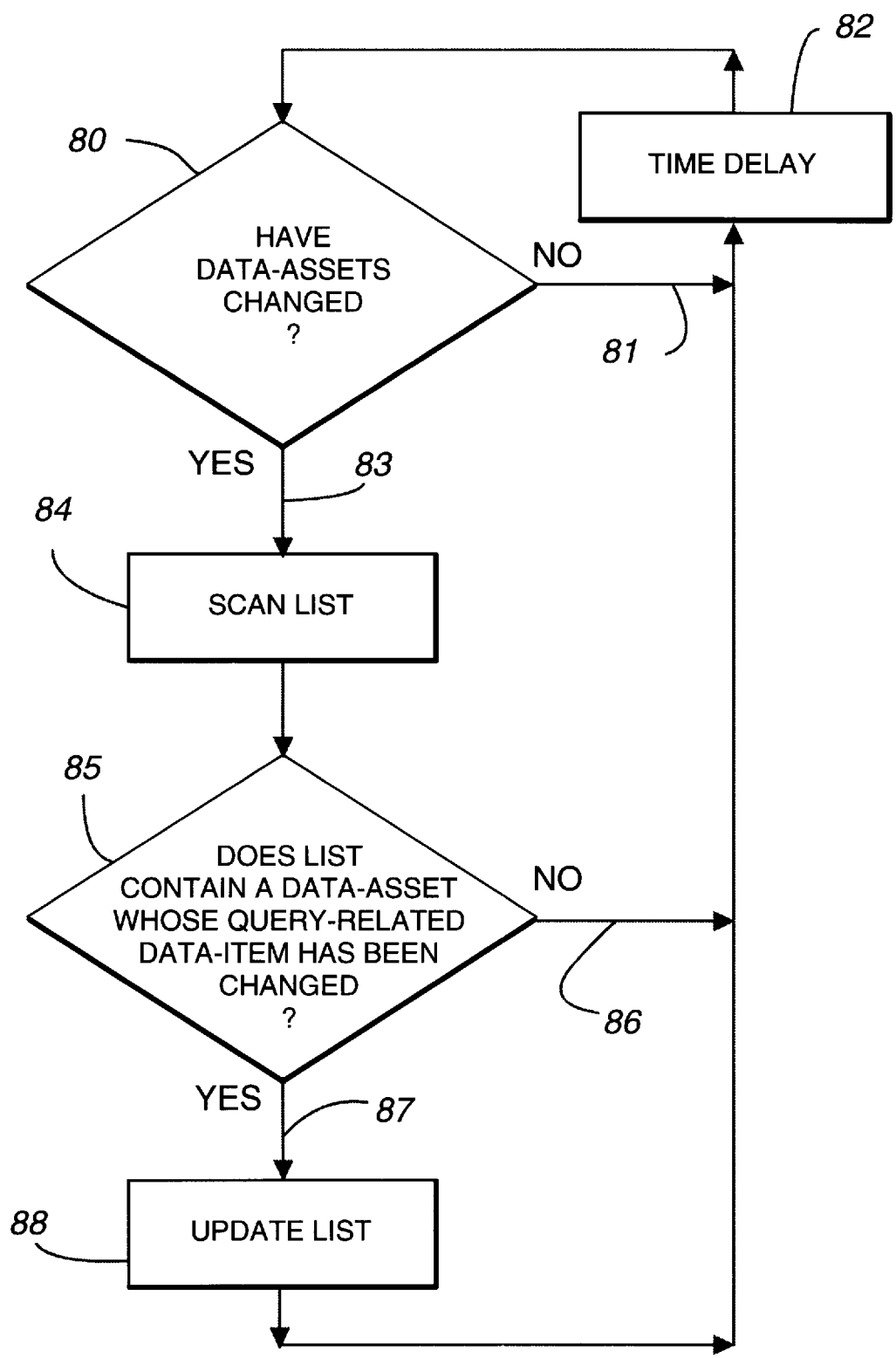
Figure 8:
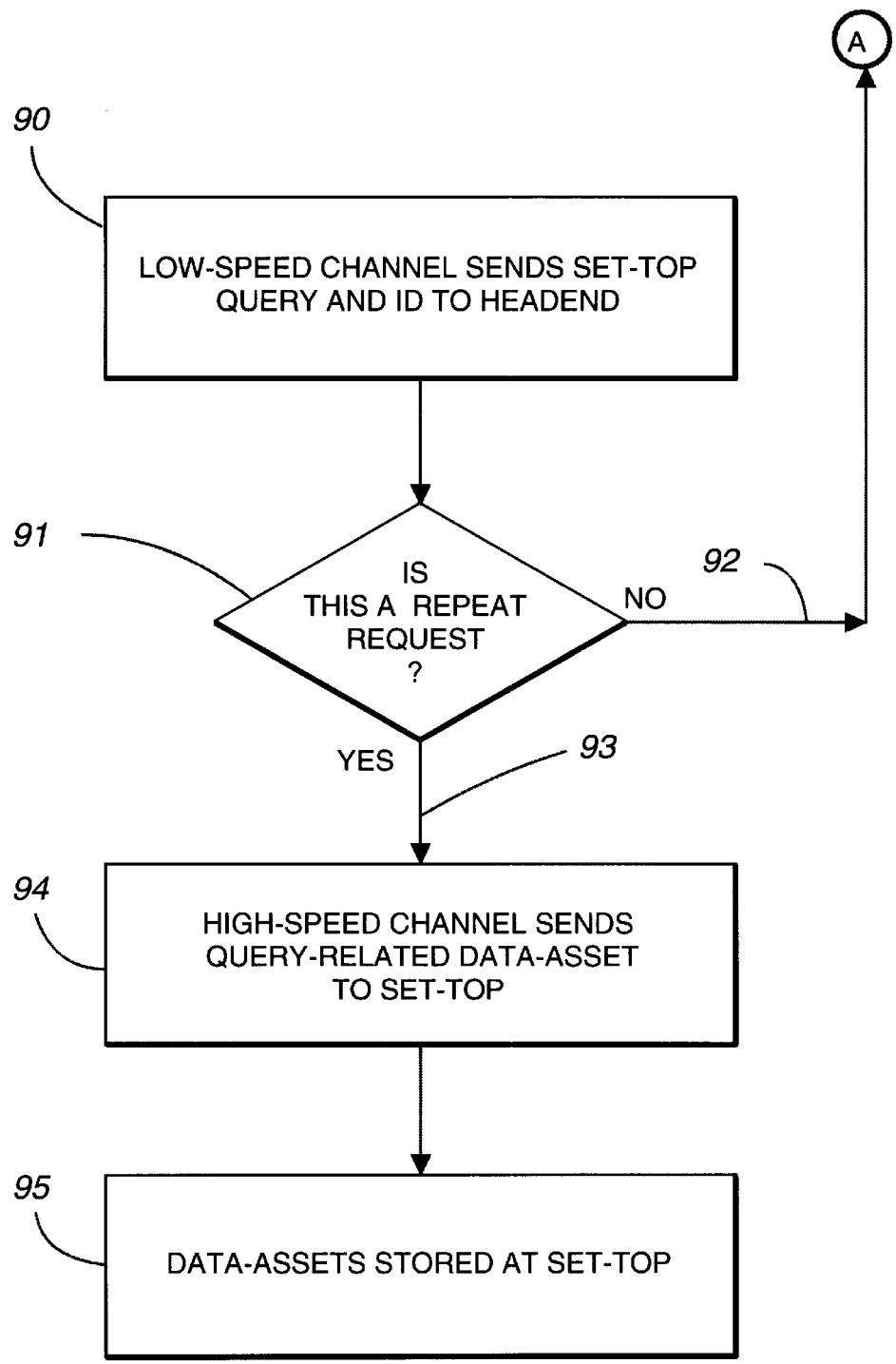

FIGS. 6, 7 and 8 show the client-pull apparatus/logic/programming of the present invention. It is to be noted that many of the individual techniques that are shown relative to client-pull, or set-top-pull, also apply to the above-described server-push construction and arrangement.

At function/apparatus/logic 70 of FIG. 6, a set-top user, or client, operates the set-top's keypad 36 to enter a set-top query. As stated previously, in the client-pull version of the present invention the set-top query will likely be related to a data-item that is not particularly time-sensitive. In this case, the set-top query will be assumed to be "T-shirt, blue, Bugs Bunny". This query "T-shirt, blue, Bugs Bunny", which can also be called a mega-data item, comprises a word-picture of the article of clothing that is of interest to the set-top's user; i.e., to the cable system's client.

At function/apparatus/logic 71, the identification or ID of this user's set-top is added to the set-top query, and at function/apparatus/logic 72 low-speed reverse channels 21 is used to send the query and its ID to headend 11.

Once this query/ID is received at the headend, headend function/apparatus/logic 73 operates to search data-assets 18 in order to associate the query with all data-assets that contain one or more individual data-items that satisfy the example set-top query "T-shirt, blue, Bugs Bunny". For example, one such match may comprise the data asset "Sears spring/summer catalogue".

At function/apparatus/logic 74, all such matching data-assets are listed in the headend's list memory 19, and at function/apparatus/logic 75, these same data-assets are sent to the set-top ID user location, using high-speed forward channels 20.

As a final step in FIG. 6, function/apparatus/logic 76 operates to store the received data-assets in memory at the set-top. Thereafter, the stored data-assets can be viewed as desired on the set-top's related TV set 14.

FIG. 7 provides a teaching as to what happens at headend 11 when the headend's data-asset memory 18 is changed by maintenance personnel at headend 11. In this operation, decision function/apparatus/logic 80 operates in a cyclic manner to monitor for changes in data-assets 18. For example, the person making such a change may be required to actuate a switch that sets a software flag. A "no" output 81 enables time-delay function/apparatus/logic 82, after which step 80 repeats.

A "yes" output 83 enables function/apparatus/logic 84 that operates to scan the list 74 of FIG. 6. This scanning operation 84 determines two things. Its first purpose is to determine if any changed data-asset is on list 74, and if so, scanning operation 84 secondly determine s if the changed portion of the changed data-asset results in a required change of the data-item that is on list 74. For example, assuming that the data-asset "Sears spring/summer catalog" is changed to "Sears fall/winter catalog", then it must be determined if the new data-asset "Sears fall/winter catalog" also contains a different "T-shirt, blue, Bugs Bunny". Decision function/apparatus/logic 85 provides this need-to-change determination or operation.

If no there is not need to change list 74, as indicated by "no" output 86 the process returns to time-delay 82. If there is a need to change list 74, "yes" output 87 enables function/apparatus/logic 88 to update list 74, i.e. to replace the spring/summer catalog data-item that initially satisfied the set-top query "T-shirt, blue, Bugs Bunny" with the fall/winter catalog data-item that now satisfies this set-top query. When update 88 is completed, the FIG. 7 process returns to time-delay 82.

As can be seen for the above description, the initial set-top query at 70 resulted in the downloading of the set-top's related data-assets at 76. Thereafter, as data-asset library 18 is changed in a set-top query related manner, the data-item/query list that was initially established at 74 is maintained current and up to date at 88. However, no additional data-assets are sent to a set-top at this time. This is usually no problem, since the related data-asset is one that has a relatively long useful life, such as a twice per year catalogue.

When the set-top user determines that a stored data-asset update is required, FIG. 8 provides for the update. At function/apparatus/logic 90 of FIG. 8, the set-top user again sends set-top query 70 of FIG. 6 to headend 11, using low-speed reverse channels 21. In response to this set-top request, decision function/apparatus/logic 91 determines if request 90 is a repeat request; i.e., is it on list 74. If it is not a repeat request, a "no" output 92 returns the process to function/apparatus/logic 73 of FIG. 6.

In the event of a repeat request 90, "yes" output 93, function/apparatus/logic 94 is enabled to send the query related data-asset to the set-top ID, using high-speed forward channels 20. The data-asset that is sent at 94 may be either the original data-asset identified at 74 of FIG. 6, or it may be a changed data-asset, as identified at 85 of FIG. 7.

Again, in response to the new set-top query 90, function/apparatus/logic 95 operates to store the data-asset at the related set-top.

As with the server-push embodiment of this invention, all transmissions by headend 11 on forward channels 20 are received by all set-tops 12 that are within ITV network 10, but only the addressed set-tops operate to store the transmission thereat.

Note that in this user-pull embodiment of the present invention, there is a one-to-one correspondence between use of low-speed reverse channels 21 to originally request a data-asset or to later request an update of the data-asset, and use of high-speed forward channels 20 to respond to each of these set-top requests. However, an advantage of client-pull is that no time is spent by headend 11 immediately updating all related set-tops, using high-speed forward channel 20, each and every time that a related data-asset is updated, when in fact this updated data-asset may not be of interest to all related set-top users.

Again, it is contemplated that in the set-top pull mode of operation of the invention a list management process would require a periodic repeat of a set-top request, or the request would be automatically erased from list memory 19.

From the foregoing description of preferred embodiments of this invention it can be seen that an interactive TV cable network 10 is provided having a headend 11 that is connected to a plurality of set-top terminals 12 by way of a forward-channel 20. Forward channels 20 enable headend-to-set-top communication. Each set-top terminal 12 includes a TV set 14 that is connected thereto. The set-top terminals 12 are connected to headend 11 by way of a reverse-channel 21 that enables set-top-to-headend communication. Headend 11 includes memory-storage 18 that contains a plurality of data-assets, each data-asset of which includes a plurality of individual data-items. The present invention provides an arrangement enabling individual set-top terminals 12 to query headend 11 for a data-item.

In the construction and arrangement of the invention, a query establishing apparatus such as key pad 36 at each of set-top terminal 12 enables a given set-top user to formulate an attribute-descriptor of a data-item that is of interest to this set-top user.

Transmitting apparatus, such as 46 of FIG. 1 or 26,27,28 of FIG. 2 at each of set-top terminal 12, facilitates transmission of this attribute-descriptor from the given set-top terminal 12 to headend 11 by way of reverse-channel 21.

Searching apparatus, such as 45 at headend 11, operates to search for memory-stored data-assets 18, and thereby forms a list memory-store 19 of query-related data-assets that contain one or more data-items that satisfy the attribute-descriptor that was transmitted to headend 11 by the given set-top terminal 12.

Transmitting apparatus, such as 44 at headend 11, operates to transmit the query-related ones of data-assets 18 to all of set-top terminals 12, but this transmission is addressed to only the given set-top terminal 12 that originated the query.

Receiving apparatus, such as 46 of FIG. 1 or 22–25 of FIG. 2 at each set-top terminal 12, enables the given set-top terminal 12 to memory-store the query-related data-assets, for example at 31–34.

Retrieving apparatus 30 at each set-top terminal 12 enables the user at the given set-top terminal to selective view the memory-stored data-assets by use of that set-top terminal's TV set 14. Updating apparatus 47 within headend 11 operates to update list memory store 19, in response to data-asset change flag 48, as the memory-stored data-assets at headend 11 are periodically changed in relation to the query attribute-descriptors that are contained in list memory 19.

The updated and query-related data-assets 18 are then transmitted to the related set-top terminals 12, by way of transmitting apparatus 44, either immediately (server-push mode of operation), or as is requested by a set-top terminal 12 (client-pull mode of operation).

The invention has been above described in detail while making reference to preferred embodiments thereof. It will be readily apparent that those skilled in the art will, upon learning of this invention, visualize yet other embodiments that are within the spirit and scope of this invention. Thus, this detailed description is not to be taken as a limitation on the spirit and scope of the invention.

What is claimed is:

1. In an interactive TV cable network having a headend that is connected to a plurality of set-top terminals by way of a forward-channel that enables headend-to-set-top communication, each of said set-top terminals including a TV set that is connected thereto, each of said set-top terminals being connected to said headend by way of a reverse-channel that enables set-top-to-headend communication, and said headend including memory-storage that contains a plurality of data-assets, each data-asset of which includes a plurality of individual data-items, an arrangement enabling set-top terminals to query said headend for a data-item, comprising:

query establishing apparatus at each of said set-top terminals enabling a given set-top terminal to formulate an attribute-descriptor of a data-item;

transmitting apparatus at each of said set-top terminals for transmitting said attribute-descriptor from said given set-top terminal to said headend by way of said reverse-channel;

searching apparatus at said headend for searching said memory-stored data-assets, and forming a list memory-store of query-related data-assets that contain one or more data-items that satisfy said attribute-descriptor transmitted by said given set-top terminal;

transmitting apparatus at said headend for transmitting said query-related data-assets to all of said set-top terminals and addressed to said given set-top terminal;

receiving apparatus at each of said set-top terminals enabling said given set-top terminal to memory-store said query-related data-assets; and updating apparatus at said headend for updating said list memory store as said memory-stored data-assets at said headend are periodically changed in relation to said query attribute-descriptor.

2. The cable network of claim 1 wherein said updating apparatus operates to automatically transmit said query-related and changed data-assets to said given set-top.

3. The cable network of claim 2 wherein said updating apparatus operates to transmit said query-related and changed data-assets to said given set-top each time that said given set-top repeats said transmission of said attribute-descriptor from said given set-top terminal to said headend by way of said reverse-channel.

4. The cable network of claim 3 wherein said forward channel is a high-speed channel, and wherein said reverse channel is a low-speed channel.

5. The cable system of claim 1 wherein said headend and said set-top communicate using shift-key modulation.

6. An interactive communication network having a headend and a plurality of multiplexed set-tops, comprising:

a forward-channel enabling said headend-to-communicate with said plurality of set-tops, and to individually address one of said plurality of set-tops;

a reverse-channel enabling said plurality of set-tops to-communicate with said headend;

a memory-store at said headend storing a plurality of data-assets;

each data-asset containing a plurality of individual data-items;

query establishing apparatus at each of said set-tops enabling a given set-top to formulate a descriptive word term that identifies a data-item that is of interest;

a transmitter at said given set-top for transmitting said descriptive word-term and an address of said given set-top to said headend;

a search engine at said headend for searching said data-assets;

said search engine operating to form a list-memory-store that lists data-assets that contain one or more data-items that satisfy said descriptive word-term;

said list-memory-store operating to associate said given set-top address with said one or more data-assets that contain one or more data-items that satisfy said descriptive-word term;

a transmitter at said headend for transmitting said one or more data-assets to all of said set-top;

said transmission being addressed to said given set-top;

a receiver at each of said given set-tops enabling said given set-top to store said transmitted one or more data-assets;

manually controlled means at said headend for selectively changing said memory storage of said plurality of data-assets;

said manual control means operating to change said one or more data-assets that contain one or more data-items that satisfy said descriptive word-term in a manner to form one or more new-data-assets that contain one or more data-items that satisfy said descriptive-word term;

updating apparatus at said headend, responsive to said control means;

said updating means being operable to retransmit said one or more new-data-assets to all of said set-top;

said retransmission being addressed to said given set-top; and said receiver at each of said given set-top enabling said given set-top to store said retransmitted one or more new-data-assets.

7. The network of claim 6 wherein said forward and reverse channels transmit shift key modulated signals.

8. The network of claim 6 wherein said set-tops are time division multiplexed onto said reverse channel.

9. The network of claim 6 wherein said update means operates selectively in response to said transmitter at said given set-top retransmitting said descriptive word-term and said address of said given set-top to said headend.

10. The network of claim 9 wherein said forward and reverse channels are shift key modulated channels.

11. The network of claim 10 wherein said forward channels are data compression channels.

12. The network of claim 6 wherein:

said forward-channel is a high-speed channel;

said reverse-channel is a low-speed channel; and said update means operates automatically in response to said manual control means operating to change said one or more data-assets that contain one or more data-items that satisfy said descriptive word-term in a manner form one or more new-data-assets that contain one or more data-items that satisfy said descriptive-word term.

13. The network of claim 12 wherein said forward and reverse channels are shift key modulation channels.

14. The network of claim 13 wherein said forward channels are data compression channels.

15. The network of claim 6 including:

interactive means at each of said set-tops;

said interactive means at said given set-top enabling interactive access to said transmission and/or retransmission.

16. The network of claim 15 wherein said forward and reverse channels transmit shift key modulated signals.

17. The network of claim 15 wherein said set-tops are time division multiplexed onto said reverse channel.

18. The network of claim 15 wherein said update means operates selectively in response to said transmitter at said given set-top retransmitting said descriptive word-term and said address of said given set-top to said headend.

19. The network of claim 18 wherein said forward and reverse channels are shift key modulated channels.

20. The network of claim 19 wherein said forward channels are data compression channels.

21. The network of claim 15 wherein:

said forward-channel is a high-speed channel;

said reverse-channel is a low-speed channel; and said update means operates automatically in response to said manual control means operating to change said one or more data-assets that contain one or more data-items that satisfy said descriptive word-term in a manner to form one or more new-data-assets that contain one or more data-items that satisfy said descriptive-word term.

22. The network of claim 21 wherein said forward and reverse channels are shift key modulation channels.

23. The network of claim 22 wherein said forward channels are data compression channels.

24. In an interactive TV cable network having a headend that is connected to a plurality of set-top terminals by way of a high-speed forward-channel that enables communication to said set-top terminals, wherein each of said set-top terminals includes a TV set that is connected thereto, wherein said set-top terminals are connected to said headend by way of a multiplexed low-speed reverse-channel that enables communication to said headend, and wherein said headend includes data-asset storage wherein each of a plurality of data-assets includes a plurality of individual data-items, an improvement enabling a user of a given set-top terminal to query said headend as to the existence of a specified data-item within said data-asset storage, comprising:

querying apparatus at each of said set-top terminals enabling said user of said given set-top terminal to formulate an attribute-descriptor of said specified data-item;

transmitting apparatus at each of said set-top terminals enabling said given set-top terminal to transmit said attribute-descriptor to said headend;

searching apparatus at said headend for searching said data-asset storage in order to form a data-item/set-top-terminal-address list that relates said given set-top terminal address to data-assets that contain one or more data-items that satisfy said attribute-descriptor;

transmitting apparatus at said headend for transmitting said one or more data-assets to all of said set-top terminals, but addressed to said given set-top terminal;

receiving apparatus at each of said set-top terminals enabling said given set-top terminal to receive and then store said one or more data-assets;

retrieving apparatus at each of said set-top terminals enabling said user at said given set-top terminal to selective view said one or more data-assets using of said TV set;

updating apparatus at said headend for updating said data-item/set-top-terminal-address list as said data-asset storage at said headend is periodically changed; and transmitting apparatus at said headend periodically enabling transmission of one or more changed data-assets to said given set-top terminal.

25. The improvement of claim 24 wherein said forward and reverse channels are shift key modulated.

26. The improvement of claim 24 wherein said forward channel is data compressed.

27. The improvement of claim 24 wherein said periodic transmission of one or more changed data-assets to said given set-top terminal is selectively effected as soon as said data-asset storage is changed.

28. The improvement of claim 24 wherein said periodic transmission of one or more changed data-assets to said given set-top terminal is effected when said headend receives a request for transmission of changed data-assets from said given set-top terminal.

29. In an interactive TV cable network having a headend that is connected to a plurality of set-top terminals by way of a forward-channel that enables headend-to-set-top communication, each of said set-top terminals including a TV set that is connected thereto, each of said set-top terminals being connected to said headend by way of a reverse-channel that enables set-top-to-headend communication, and said headend including memory-storage that contains a plurality of data-assets, each data-asset of which includes a plurality of individual data-items, a method arrangement enabling set-top terminals to query said headend for a data-item, comprising:

providing query establishing apparatus at each of said set-top terminals enabling a given set-top terminal to formulate an attribute-descriptor of a data-item;

providing transmitting apparatus at each of said set-top terminals for transmitting said attribute-descriptor from said given set-top terminal to said headend by way of said reverse-channel;

providing searching apparatus at said headend for searching said memory-stored data-assets, and forming a list memory-store of query-related data-assets that contain one or more data-items that satisfy said attribute-descriptor transmitted by said given set-top terminal;

providing transmitting apparatus at said headend for transmitting said query-related data-assets to all of said set-top terminals and addressed to said given set-top terminal;

providing receiving apparatus at each of said set-top terminals enabling said given set-top terminal to memory-store said query-related data-assets, and providing updating apparatus at said headend for updating said list memory store as said memory-stored data-assets at said headend are periodically changed in relation to said query attribute-descriptor; and automatically transmit said query-related and changed data-assets to said given set-top.

30. The method of claim 29 wherein said updating step operates to automatically transmit said query-related and changed data-assets to said given set-top each time that said given set-top repeats said transmission of said attribute-descriptor from said given set-top terminal to said headend by way of said reverse-channel.

31. The method of claim 29 wherein said updating step operates to automatically transmit said query-related and changed data-assets to said given set-top each time that said searching apparatus forms a new list memory-store of query-related data-assets that contain one or more data-items that satisfy said attribute-descriptor transmitted by said given set-top terminal.

* * * * *